United States Patent
Ogino et al.

(10) Patent No.: US 10,181,198 B2
(45) Date of Patent: Jan. 15, 2019

(54) DATA PROCESSING APPARATUS, COLOR IDENTIFICATION METHOD, NON-TRANSITORY COMPUTER READABLE MEDIUM, AND COLOR CHART

(71) Applicant: FUJI XEROX CO., LTD., Tokyo (JP)

(72) Inventors: Ken Ogino, Kanagawa (JP); Hitoshi Ogatsu, Kanagawa (JP); Shinji Sasahara, Kanagawa (JP); Junichi Matsunoshita, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 47 days.

(21) Appl. No.: 15/217,868

(22) Filed: Jul. 22, 2016

(65) Prior Publication Data
US 2017/0278257 A1    Sep. 28, 2017

(30) Foreign Application Priority Data
Mar. 25, 2016  (JP) .................................. 2016-062586

(51) Int. Cl.
*G06T 7/40* (2017.01)
*G06K 9/46* (2006.01)

(52) U.S. Cl.
CPC ............ *G06T 7/408* (2013.01); *G06K 9/4652* (2013.01)

(58) Field of Classification Search
CPC .. G06T 7/408; H04N 1/6033; G06K 15/1878; G06K 15/027; G06K 15/1802; G06K 9/4652
See application file for complete search history.

(56) References Cited

U.S. PATENT DOCUMENTS

| | | | | |
|---|---|---|---|---|
| 2,007,264 | A * | 7/1935 | Allen | G01J 3/52 434/98 |
| 3,384,983 | A * | 5/1968 | Olson | G01J 3/52 434/98 |
| 5,339,176 | A * | 8/1994 | Smilansky | G06F 17/15 358/504 |
| 5,414,537 | A * | 5/1995 | Omuro | H04N 1/60 358/518 |
| 6,549,653 | B1 * | 4/2003 | Osawa | H04N 1/60 358/504 |

(Continued)

FOREIGN PATENT DOCUMENTS

JP        2009-157486 A        7/2009

*Primary Examiner* — Jingge Wu
(74) *Attorney, Agent, or Firm* — Oliff PLC

(57) ABSTRACT

A data processing apparatus includes an obtaining unit and a converting unit. The obtaining unit obtains measured color sample data, which represents values obtained by measuring color samples on a color chart with a color measuring device, and image data, which represents an image of the color chart and a target object captured with an image capturing apparatus. The converting unit converts captured target object color data, which represents a value of a color of the target object included in the image data, into estimated target object color data, which represents an estimated value of the color of the target object identified if the color of the target object were measured with the color measuring device, on the basis of the measured color sample data and captured color sample data, which represents values of the multiple color samples included in the image data.

11 Claims, 10 Drawing Sheets

(56) References Cited

U.S. PATENT DOCUMENTS

| | | | | |
|---|---|---|---|---|
| 7,586,642 B2* | 9/2009 | Chiba | H04N 1/6033 | 358/1.9 |
| 8,971,618 B2* | 3/2015 | Moroney | G01J 3/463 | 382/165 |
| 2003/0016251 A1* | 1/2003 | Kondo | H04N 1/6011 | 715/846 |
| 2003/0156194 A1* | 8/2003 | Sugiura | H04N 17/002 | 348/187 |
| 2004/0190022 A1* | 9/2004 | Kiyohara | H04N 1/603 | 358/1.9 |
| 2004/0239935 A1* | 12/2004 | Kitazawa | G01J 3/46 | 356/406 |
| 2006/0034728 A1* | 2/2006 | Kloepfer | A61B 5/14532 | 422/68.1 |
| 2006/0187455 A1* | 8/2006 | Ito | G01J 3/46 | 356/402 |
| 2006/0250668 A1* | 11/2006 | Komiya | G01J 3/46 | 358/504 |
| 2007/0153340 A1* | 7/2007 | Itagaki | G03G 15/01 | 358/504 |
| 2007/0183659 A1* | 8/2007 | Itagaki | G01J 3/52 | 382/162 |
| 2007/0230832 A1* | 10/2007 | Usui | A61B 5/1034 | 383/4 |
| 2010/0220314 A1* | 9/2010 | von Orelli | B41F 33/0081 | 356/51 |
| 2010/0328691 A1* | 12/2010 | Hoshino | H04N 1/6055 | 358/1.9 |
| 2012/0081722 A1* | 4/2012 | Katayama | H04N 1/6033 | 358/1.9 |
| 2012/0099788 A1* | 4/2012 | Bhatti | G01J 3/462 | 382/167 |
| 2012/0206728 A1* | 8/2012 | Meijer | G01J 3/463 | 356/405 |
| 2012/0263379 A1* | 10/2012 | Bhatti | G06T 11/001 | 382/167 |
| 2012/0293803 A1* | 11/2012 | Arai | G01J 3/1256 | 356/416 |
| 2013/0063723 A1* | 3/2013 | Shimbo | B41F 33/00 | 356/328 |
| 2013/0235398 A1* | 9/2013 | Bhatti | H04N 1/603 | 358/1.9 |
| 2013/0242320 A1* | 9/2013 | Suzuki | H04N 1/6033 | 358/1.9 |
| 2015/0037748 A1* | 2/2015 | Rohner | A61C 19/10 | 433/26 |
| 2017/0314993 A1* | 11/2017 | Harada | G01J 3/52 | |

* cited by examiner

FIG. 5

| COLOR CHART ID | MEASURED COLOR SAMPLE |
|---|---|
| ... | ... |
| ... | ... |
| ⋮ | ⋮ |

FIG. 6

| USER ID | PASSWORD |
|---|---|
| ... | ... |
| ... | ... |
| ⋮ | ⋮ |

FIG. 7

| TARGET OBJECT NAME | LOCATION | USER ID |
|---|---|---|
| ... | ... | ... |
| ... | ... | ... |
| ⋮ | ⋮ | ⋮ |

FIG. 8

| IMAGE-CAPTURING DATE/TIME | ESTIMATED TARGET OBJECT COLOR |
|---|---|
| ... | ... |
| ... | ... |
| ⋮ | ⋮ |

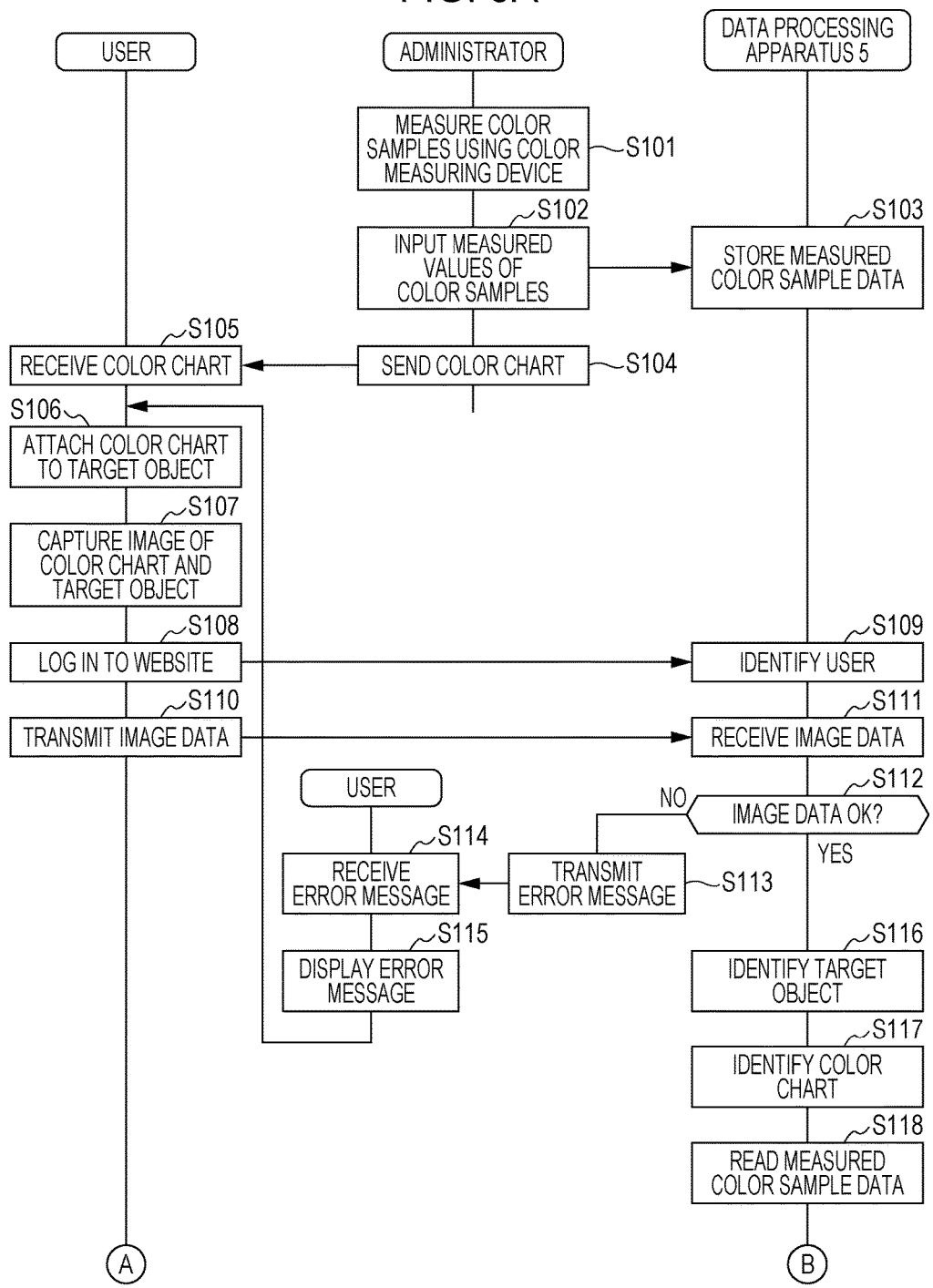

DATA PROCESSING APPARATUS, COLOR IDENTIFICATION METHOD, NON-TRANSITORY COMPUTER READABLE MEDIUM, AND COLOR CHART

CROSS-REFERENCE TO RELATED APPLICATIONS

This application is based on and claims priority under 35 USC 119 from Japanese Patent Application No. 2016-062586 filed Mar. 25, 2016.

BACKGROUND

Technical Field

The present invention relates to a technique for identifying the color of a target object.

SUMMARY

According to an aspect of the invention, there is provided a data processing apparatus including an obtaining unit and a converting unit. The obtaining unit obtains measured color sample data and image data. The measured color sample data represents values obtained by measuring multiple color samples on a color chart with a color measuring device. The image data represents an image of the color chart and a target object captured with an image capturing apparatus. The converting unit converts captured target object color data into estimated target object color data on the basis of the measured color sample data and captured color sample data representing values of the multiple color samples included in the image data. The captured target object color data represents a value of a color of the target object included in the image data. The estimated target object color data represents an estimated value of the color of the target object identified if the color of the target object were measured with the color measuring device.

BRIEF DESCRIPTION OF THE DRAWINGS

An exemplary embodiment of the present invention will be described in detail based on the following figures, wherein:

FIG. 5 illustrates a data structure of a color chart table according to the exemplary embodiment;

FIG. 6 illustrates a data structure of a user table according to the exemplary embodiment;

FIG. 7 illustrates a data structure of a target object table according to the exemplary embodiment;

FIG. 8 illustrates a data structure of an estimated target object color table according to the exemplary embodiment;

FIGS. 9A and 9B illustrate a flow of the color identification method according to the exemplary embodiment;

DETAILED DESCRIPTION

A color identification method M according to an exemplary embodiment of the present invention will be described below. The color identification method M is a method for estimating a color of a target object obtained if the color of the target object were measured with a color measuring device, instead of measuring the color of the target object with the color measuring device.

Figure 1:
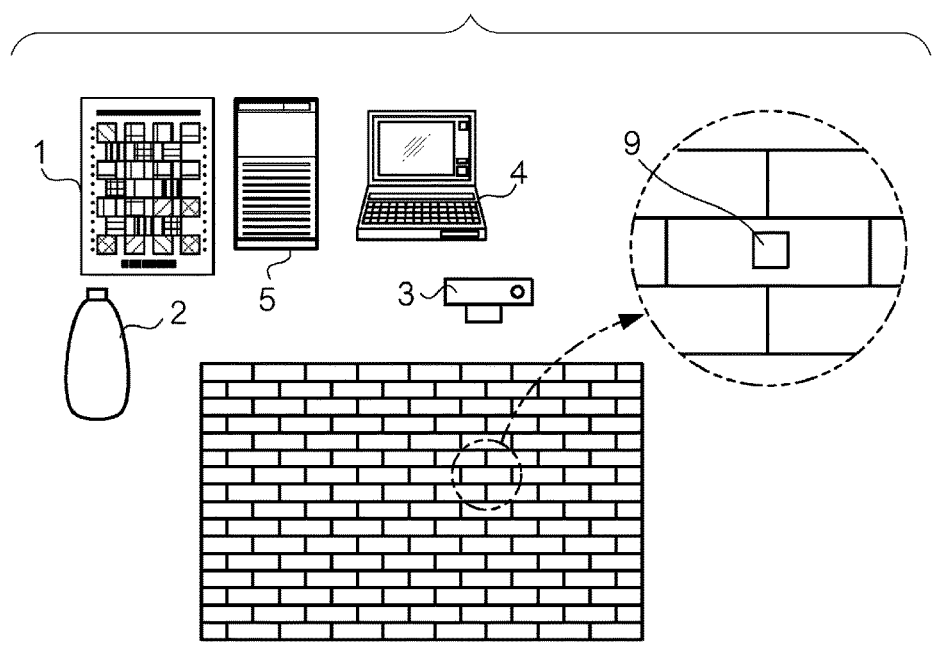
FIG. 1 illustrates apparatuses and the like used in a color identification method according to an exemplary embodiment.

FIG. 1 illustrates apparatuses and the like used in the color identification method M. A color chart 1, a color measuring device 2, an image capturing apparatus 3, a terminal apparatus 4, and a data processing apparatus 5 are used in the color identification method M. A target object 9 illustrated in FIG. 1 is a target object whose color is to be estimated. The target object 9 illustrated in FIG. 1 is part of a brick wall.

The color chart 1 is a sheet-like medium. The color chart 1 is attached to the target object 9, and in that state an image of the color chart 1 and the target object 9 is captured with the image capturing apparatus 3. The color measuring device 2 is a device that measures color samples on the color chart 1. The color measuring device 2 measures a color of a target object without being affected by the intensity and the frequency characteristics of light, for example. The image capturing apparatus 3 captures an image of the target object 9 having the color chart 1 attached thereto. The terminal apparatus 4 transmits image data representing the image captured with the image capturing apparatus 3 to the data processing apparatus 5. The data processing apparatus 5 estimates a measured value obtained if the color of the target object 9 were measured with the color measuring device 2, on the basis of the measured values of the color samples on the color chart 1 which are obtained by the color measuring device 2 and the image captured with the image capturing apparatus 3.

FIG. 1 illustrates one color chart 1, one image capturing apparatus 3, one terminal apparatus 4, and one target object 9. However, in practice, for each of the plural target objects 9, the color chart 1 that is attached to the target object 9 and is subjected to image capturing, the image capturing apparatus 3 that captures an image of the target object 9, and the terminal apparatus 4 that transmits image data representing the image of the target object 9 to the data processing apparatus 5 are used.

Figure 2:
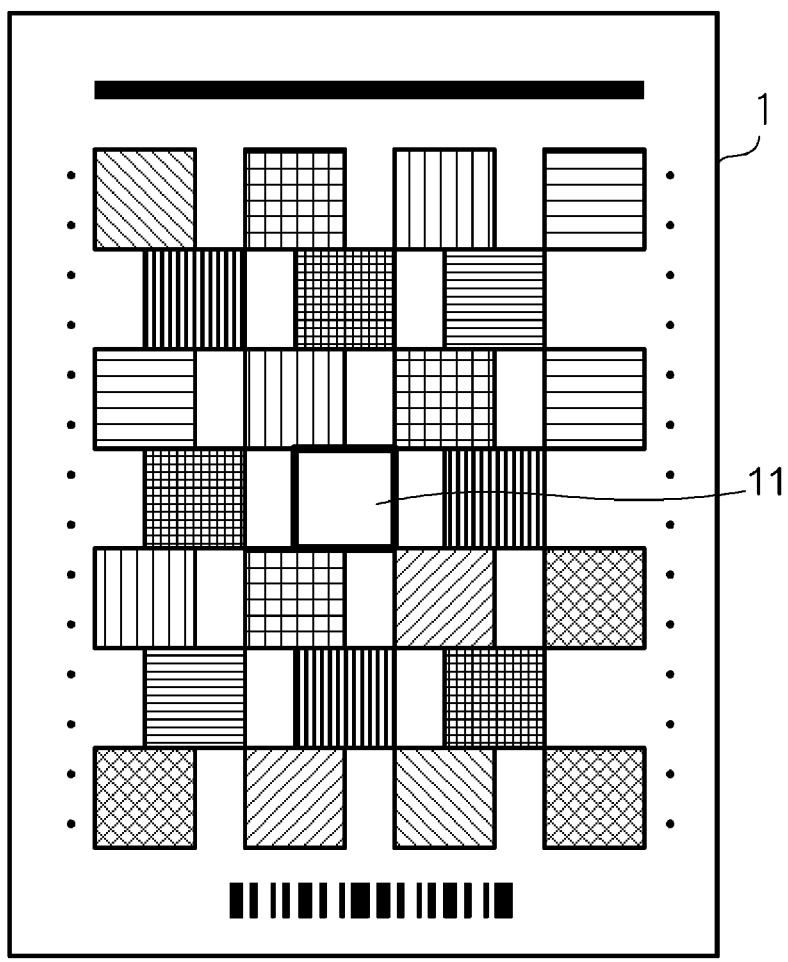
FIG. 2 illustrates a color chart according to the exemplary embodiment.

FIG. 2 illustrates the color chart 1. The color chart 1 is a sheet-like medium (e.g., paper or plastic sheet) having multiple color samples thereon. In the color chart 1 illustrated in FIG. 2, color samples are vertically arranged in seven rows on the white background. Four different color samples are arranged in odd-numbered rows among the seven rows, and three different color samples are arranged in even-numbered rows. Note that two color samples and one hole are arranged in the fourth row instead of three color samples, as described later. The color samples are painted in squares of the same size, and horizontally adjacent color samples are spaced apart by half the length of the side of the squares of the color samples. In addition, the color samples in the odd-numbered rows and the color samples in the even-numbered rows are horizontally shifted from each other by half the length of the side of the squares of the color samples.

Evenly spaced black dots are vertically arranged on the left and right sides of an area where the color samples are arranged. In addition, a horizontally extending black rectangular bar is arranged on the upper side of the area where the color samples are arranged. These dots and bar are markers used by the data processing apparatus 5 to identify an area of each color sample in the image captured with the image capturing apparatus 3.

A two-dimensional image code is arranged on the lower side of the area where the color samples are arranged. The two-dimensional image code is an identifier for identifying the color chart 1 from the other color charts 1. In this exemplary embodiment, color uniformity is guaranteed for the plural color charts 1 of the same production lot even if the color charts 1 are used for the different target objects 9. Accordingly, the color charts 1 of the same production lot are treated as those need not be distinguished from one another. That is, the same two-dimensional image code is arranged on the plural color charts 1 of the same production lot.

An image-capturing window 11, which is a square through-hole having a size that is the same as the size of the squares of the color samples, is provided at the center in the horizontal direction in the fourth row among the seven rows in which the color samples are arranged. The image-capturing window 11 is a hole provided to allow the image capturing apparatus 3 to capture an image of the target object 9 with the color chart 1 being attached the target object 9. That is, the image capturing apparatus 3 is able to capture an image of the target object 9 located behind the color chart 1 through the image-capturing window 11.

Since the color measuring device 2 is a commonly-used known color measuring device, a description thereof is omitted. Since the image capturing apparatus 3 is a commonly-used known digital camera having a function of determining the location thereof using a satellite positioning system or the like, a description thereof is omitted. Since the terminal apparatus 4 is a commonly-used known terminal apparatus having a browser function for displaying a website provided by the data processing apparatus 5, a description thereof is omitted. Note that, for example, a tablet computer including a digital camera may be used as an apparatus serving as both the image capturing apparatus 3 and the terminal apparatus 4.

Figure 3:
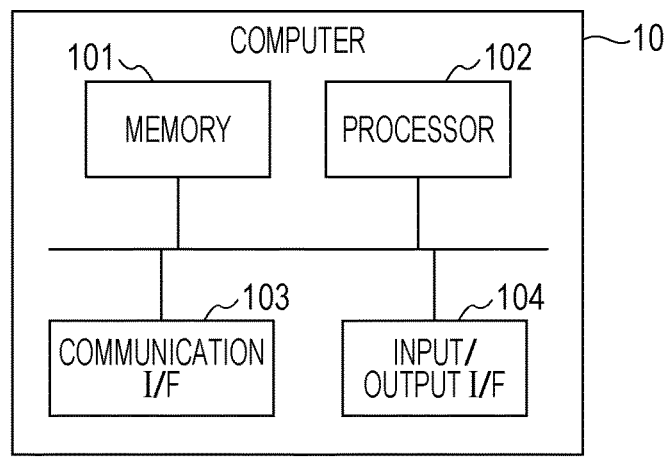
FIG. 3 illustrates a configuration of a computer according to the exemplary embodiment.

In this exemplary embodiment, the data processing apparatus 5 is implemented by a computer. Specifically, the computer performs data processing based on a program according to this exemplary embodiment, thereby functioning as the data processing apparatus 5. FIG. 3 illustrates a configuration of a computer 10 used to implement the data processing apparatus 5. The computer 10 includes a memory 101, a processor 102, a communication interface (I/F) 103, and an input/output I/F 104. The memory 101 stores various kinds of data. The processor 102 performs data processing in accordance with a program stored in the memory 101. The communication I/F 103 is an interface that performs data communication via a network with an external apparatus. The input/output I/F 104 is an interface that receives and outputs operation data and image data from and to an external apparatus. An operation device, such as a keyboard or a mouse, and a display device, such as a liquid crystal display, are connected to the input/output I/F 104.

Figure 4:
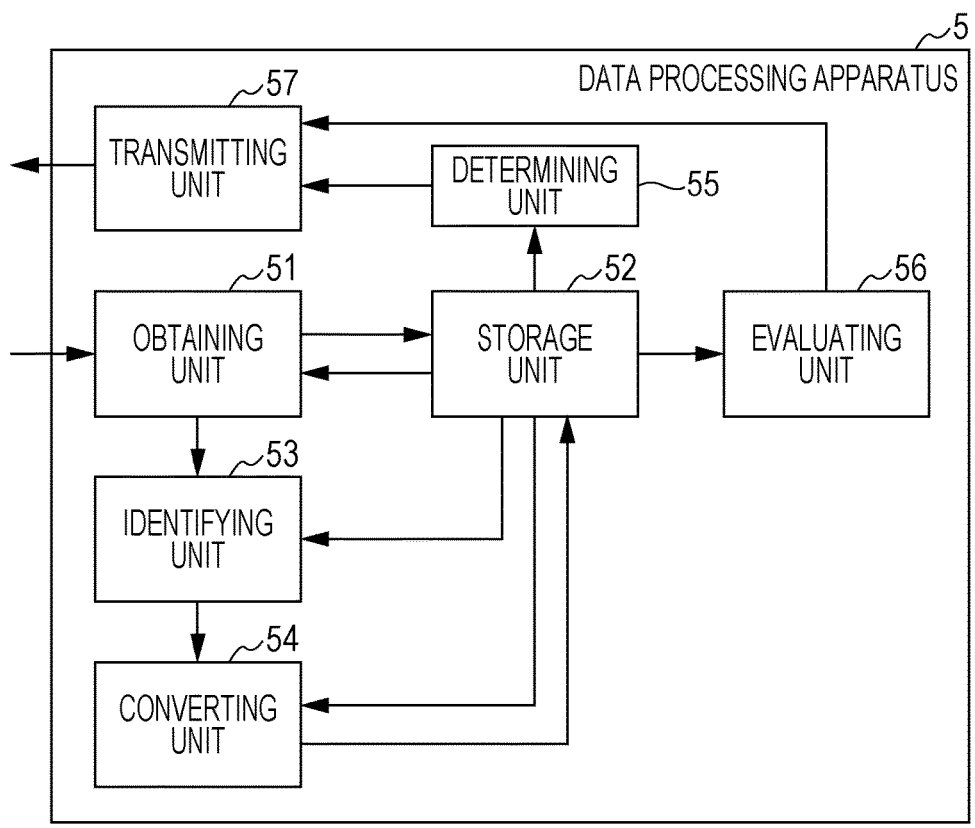
FIG. 4 illustrates a configuration of a data processing apparatus according to the exemplary embodiment.

FIG. 4 illustrates a configuration of the data processing apparatus 5. A program according to this exemplary embodiment causes the computer 10 to function as units illustrated in FIG. 4. The data processing apparatus 5 includes an obtaining unit 51 and a storage unit 52. The obtaining unit 51 obtains various kinds of data. The storage unit 52 stores various kinds of data.

The data processing apparatus 5 also includes an identifying unit 53 and a converting unit 54. The identifying unit 53 identifies correspondences each between a measured value of a color obtained with the color measuring device 2 and a value of the color in an image captured with the image capturing apparatus 3. The converting unit 54 converts, on the basis of the correspondences identified by the identifying unit 53, a value of a color of the target object 9 included in the image captured with the image capturing apparatus 3 into an estimated value of a measured value of the color of the target object 9 obtained if the color of the target object 9 were measured with the color measuring device 2.

The data processing apparatus 5 also includes a determining unit 55, an evaluating unit 56, and a transmitting unit 57. The determining unit 55 determines whether image data received by the obtaining unit 51 from the terminal apparatus 4 satisfies a predetermined condition. The evaluating unit 56 evaluates the color of the target object 9 on the basis of the estimated value of the color of the target object 9 obtained by the converting unit 54 and a value of a reference color. The transmitting unit 57 transmits the determination result obtained by the determining unit 55 and the evaluation result obtained by the evaluating unit 56 to the terminal apparatus 4.

Roles of the individual units of the data processing apparatus 5 will be described also in a description of the flow of the color identification method M below.

Various kinds of data stored in the storage unit 52 will be described below. FIG. 5 illustrates a data structure of a color chart table stored in the storage unit 52. The color chart table is a collection of records each for a corresponding one of the color charts 1. The color chart table includes fields "COLOR CHART ID" and "MEASURED COLOR SAMPLE". The field "COLOR CHART ID" stores a color chart ID used to identify the color chart 1. The two-dimensional image code on the color chart 1 is an image obtained by encoding the color chart ID stored in the field "COLOR CHART ID".

The field "MEASURED COLOR SAMPLE" stores measured color sample data representing values obtained by measuring respective color samples on the color chart 1 with the color measuring device 2. In this exemplary embodiment, the values obtained by measuring the respective colors with the color measuring device 2 are values according to CIE Lab (L*a*b* color space).

FIG. 6 illustrates a data structure of a user table stored in the storage unit 52. The user table is a collection of records each for a corresponding one of users of a color identification service provided by the data processing apparatus 5. The user table includes fields "USER ID" and "PASSWORD". The field "USER ID" stores data representing the name of a user. The field "PASSWORD" stores a password used for authentication of the user.

FIG. 7 illustrates a data structure of a target object table stored in the storage unit 52. The target object table is a collection of records each for a corresponding one of the plural target objects 9. The target object table includes fields "TARGET OBJECT NAME", "LOCATION", and "USER ID". The field "TARGET OBJECT NAME" stores data representing the name of the target object 9. The field "LOCATION" stores location data representing the location of the target object 9 using the longitude and latitude. In this exemplary embodiment, the target objects 9 are distinguished from one another based on the location data. The field "USER ID" stores the user ID of the user who is a person requesting identification of the color of the target object 9.

FIG. 8 illustrates a data structure of an estimated target object color table stored in the storage unit 52. The estimated target object color table is stored in the storage unit 52 in association with each target object 9 and stores estimated target object color data representing the estimated value of the color of the target object 9 obtained by the converting unit 54. The estimated target object color table is a collection of records each for a corresponding one of images used to estimate the value of the color of the target object 9. The estimated target object color table includes fields "IMAGE-CAPTURING DATE/TIME" and "ESTIMATED TARGET OBJECT COLOR".

The field "IMAGE-CAPTURING DATE/TIME" stores data representing the date and time at which the image used to estimate the value of the color of the target object 9 has been captured. The field "ESTIMATED TARGET OBJECT COLOR" stores estimated target object color data representing a value (value according to the L*a*b* color space) of the color of the target object 9 estimated by the converting unit 54 on the basis of the image.

Figure 9B:
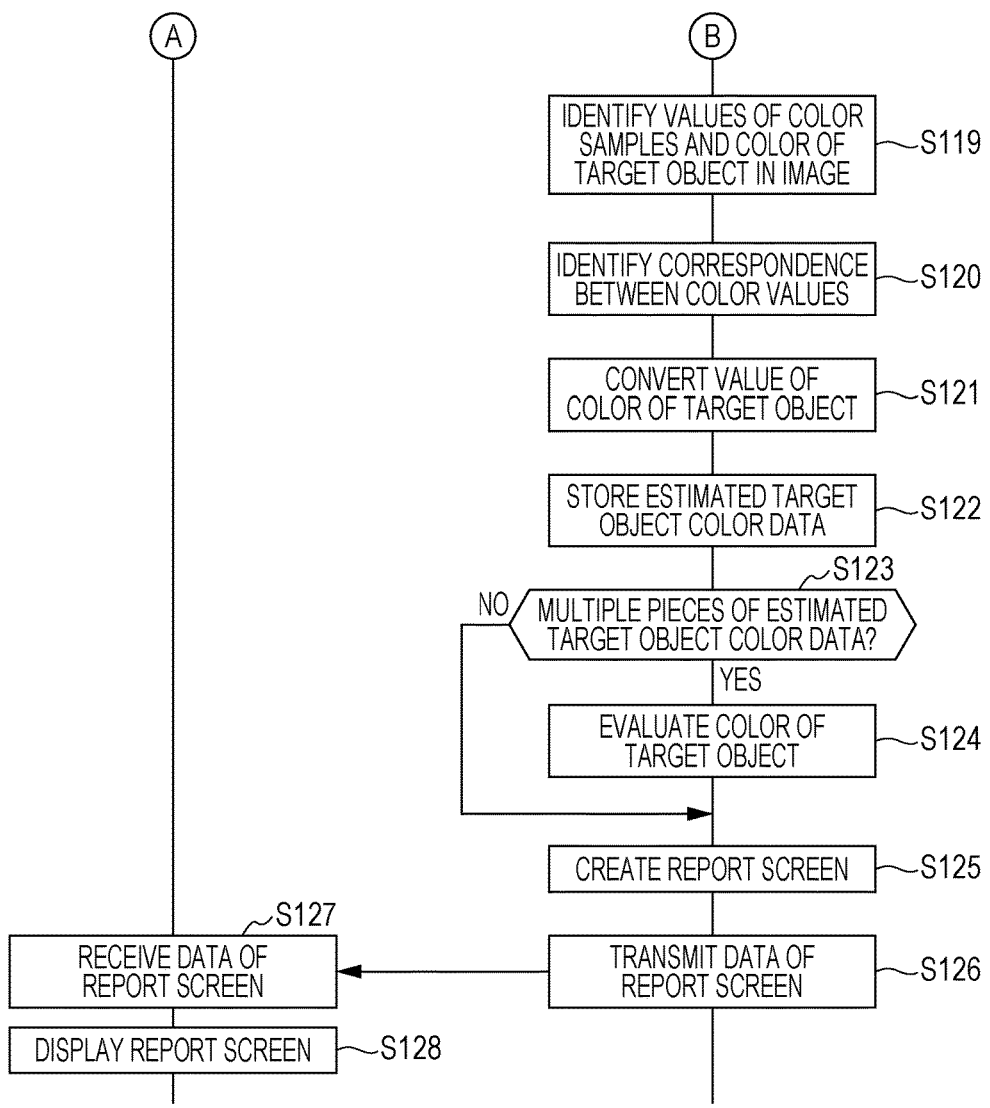

The flow of the color identification method M will now be described. FIGS. 9A and 9B illustrate the flow of the color identification method M. An administrator of the data processing apparatus 5 (hereinafter, simply referred to as an administrator) measures each of the color samples on the color chart 1 using the color measuring device 2 (step S101). The administrator then inputs the color chart ID of the color chart 1 on which the measurement has been performed using the color measuring device 2 and the measured values (values according to the L*a*b* color space) of the color samples obtained by the color measuring device 2 to the data processing apparatus 5, for example, using a keyboard connected to the data processing apparatus 5 (step S102). The administrator performs operations of steps S101 and S102 for each production lot of the color charts 1.

In response to the input operation performed by the administrator in step S102, the data processing apparatus 5 adds a new record to the color chart table (FIG. 5), and stores the color chart ID input by the administrator at the field "COLOR CHART ID" of the added record and stores the measured color sample data representing the measured values of the color samples input by the administrator at the field "MEASURED COLOR SAMPLE" of the added record (step S103).

The administrator then puts the color chart 1 in an envelope having a good light-shielding property and sends it to a user who is, for example, an owner of the target object 9 whose color is to be identified (step S104). The user receives the color chart 1 sent from the administrator (step S105) and stores the color chart 1 in the envelope having a good light-shielding property except when it is used.

When the user wishes to identify the color of the target object 9, the user temporarily attaches the color chart 1 to the target object 9 (step S106). For example, if the target object 9 is part of a large object as illustrated in FIG. 1 and the user wishes to identify the color of the target object 9 multiple times, the user records the position where the color chart 1 is initially attached, for subsequent color identification processes.

Figure 10:
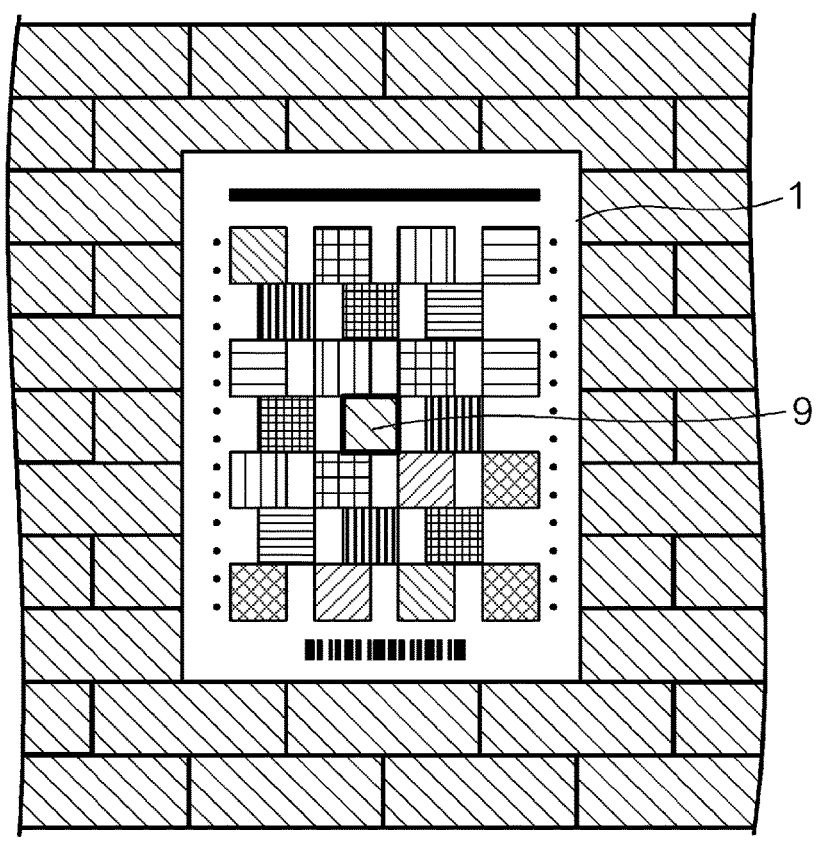
FIG. 10 illustrates a state in which the color chart is attached to a target object in accordance with the color identification method according to the exemplary embodiment.

FIG. 10 illustrates a state in which the color chart 1 is attached to the target object 9 that is part of a brick wall, for example. Adjacent bricks in the brick wall illustrated in FIG. 10 have different colors. Accordingly, if the position where the color chart 1 is attached to the wall during the first color identification process differs from the position of the color chart 1 during the second color identification process, a target for which the color is identified changes. Accordingly, for example, the user may mark the attached position of the color chart 1 to allow the color chart 1 to be attached to the same position of the wall during the second and later color identification processes.

After the color chart 1 has been attached to the target object 9 (step S106 in FIG. 9A), the user captures an image of the color chart 1 attached to the target object 9 from the front using the image capturing apparatus 3 (step S107). The image captured with the image capturing apparatus 3 includes the color chart 1 and the target object 9 seen through the image-capturing window 11 of the color chart 1. Image data representing the image captured with the image capturing apparatus 3 has date/time data and location data added thereto. The date/time data indicates the date/time at which the image has been captured with the image capturing apparatus 3. The location data indicates the location of the image capturing apparatus 3 at the time of image capturing by using the latitude and longitude.

After finishing capturing the image, the user takes off the color chart 1 from the target object 9 and puts the color chart 1 in the envelope having a good light-shielding property. The user then causes the terminal apparatus 4 to load the image data generated by the image capturing apparatus 3 via, for example, a recording medium, and then causes the browser of the terminal apparatus 4 to display a login screen of a website provided by the data processing apparatus 5, inputs the user ID and the password, and logs in to the website (step S108). The data processing apparatus 5 checks that the user ID and the password transmitted from the terminal apparatus 4 in step S108 match data stored in any of the records of the user table (FIG. 6). In this way, the data processing apparatus 5 successfully identifies the user (step S109). If the user ID and the password do not match the data and the login attempt is unsuccessful, the data processing apparatus 5 transmits, to the terminal apparatus 4, an error message requesting re-input of a password (FIG. 9A omits illustration).

Then, the user causes the browser of the terminal apparatus 4 to display an image data uploading screen and performs an operation for uploading the image data representing the image captured in step S107 to the data processing apparatus 5. In response to the operation, the image data is transmitted from the terminal apparatus 4 to the data processing apparatus 5 (step S110).

The obtaining unit 51 of the data processing apparatus 5 receives the image data transmitted from the terminal apparatus 4 (step S111). The image data received by the obtaining unit 51 is temporarily stored in the storage unit 52. The determining unit 55 then determines whether the received image data satisfies a predetermined condition (step S112). The predetermined condition used in the determination in step S112 may be a condition as to whether or not a brightness, a color irregularity, a distortion, an out-of-focus degree, a reflection, a runout, a size, or the like of the image represented by the image data is within a predetermined range.

If it is determined in step S112 that the image data does not satisfy the predetermined condition (NO in step S112), the transmitting unit 57 transmits, to the terminal apparatus 4, an error message requesting re-transmission of image data (step S113). Upon receipt of the error message transmitted from the data processing apparatus 5 in step S113 (step S114), the terminal apparatus 4 displays the error message (step S115). In response to the error message displayed in step S115, the user performs operations of steps S106 to S108 and S110 again after temporarily logging out from the website, for example.

If it is determined in step S112 that the image data received by the data processing apparatus 5 from the terminal apparatus 4 satisfies the predetermined condition (YES in step S112), the obtaining unit 51 reads from the target object table (FIG. 7) the target object name corresponding to location data added to the image data. In this way, the data processing apparatus 5 successfully identifies the target object 9 for which color identification is performed (step S116).

The obtaining unit 51 then decodes the two-dimensional image code included in the image represented by the image data into the color chart ID. In this way, the data processing apparatus 5 successfully identifies the color chart 1 used for capturing of the image (step S117). The obtaining unit 51 then reads and obtains from the color chart table (FIG. 5) the measured color sample data corresponding to the color chart ID indicated by the two-dimensional image code (step S118).

The identifying unit 53 then identifies values of the multiple color samples included in the image data and a value of a color of the target object 9 included in the image data (step S119). In step S119, the identifying unit 53 performs corrections such as brightness correction and distortion connection on the image data if necessary and then identifies areas of the color samples and an area of the image-capturing window 11 (the target object 9) in the image with reference to the markers (the dots and the bar) on the color chart 1 included in the image. For each of the identified areas, the identifying unit 53 specifies a representative value (e.g., an average value) of color values of pixels included in the area as the value of the corresponding color sample or the value of the color of the target object 9 in the image. The identifying unit 53 temporarily stores data representing the values of the color samples in the image as the captured color sample data in the storage unit 52. In addition, the identifying unit 53 temporarily stores data representing the value of the color of the target object 9 in the image as the captured target object color data in the storage unit 52.

In this exemplary embodiment, the image captured with the image capturing apparatus 3 is a collection of pixels each represented by a value according to the RGB color model. Accordingly, the captured color sample data and the captured target object color data generated by the identifying unit 53 in step S119 represent colors by using values according to the RGB color model.

The identifying unit 53 then identifies correspondences each between a value of a color measured by the color measuring device 2 and a value of the color in the image represented by the image data transmitted from the terminal apparatus 4, on the basis of the measured values of the color samples obtained by the color measuring device 2 (values according to the L*a*b* color space) represented by the measured color sample data obtained as a result of the obtaining unit 51 reading the measured color sample data from the color chart table in step S118 and the values of the color samples (values according to the RGB color model) in the image represented by the captured color sample data temporarily stored in step S119 (step S120).

In this exemplary embodiment, the identifying unit 53 identifies a transform matrix H using the multiple regression analysis, as the correspondences between the measured values of the colors obtained by the color measuring device 2 and the values of the respective colors in the image. The transform matrix H is a matrix that makes the individual values of the multiple color samples represented by the captured color sample data match the values of the respective color samples represented by the measured color sample data as much as possible. That is, the identifying unit 53 identifies the transform matrix H that minimizes a difference between a vector having the measured values of the color samples represented by the measured color sample data as its elements and a vector obtained by multiplying a vector having the values of the multiple color samples represented by the captured color sample data as its elements by the transform matrix H.

Then, the converting unit 54 reads, from the storage unit 52, the captured target object color data temporarily stored in step S119 and converts, on the basis of the transform matrix H identified by the identifying unit 53 in step S120, the read captured target object color data into estimated target object color data representing an estimated value of the color of the target object 9 identified if the color of the target object 9 were measured with the color measuring device 2 (step S121). Specifically, the converting unit 54 generates, as the estimated target object color data, data representing a value obtained by multiplying the value represented by the captured target object color data by the transform matrix H. Note that the value represented by the estimated target object color data is a value according to the L*a*b* color space.

The converting unit 54 then adds a new record to the estimated target object color table (FIG. 8) corresponding to the target object name of the target object 9 identified in step S116 and stores, in the added record, the date/time data added to the image data received by the data processing apparatus 5 from the terminal apparatus 4 in step S111 and the estimated target object color data generated by the conversion in step S121 (step S122).

Then, the evaluating unit 56 determines whether the estimated target object color table to which the new record has been added in step S122 has plural records (step S123). When the estimated target object color data is generated for the first time in step S121 for the certain target object 9, the estimated target object color table for the target object 9 includes only one record. Thus, the evaluating unit 56 determines in step S123 that the estimated target object color table corresponding to the target object 9 does not have plural records (NO in step S123). In such a case, the evaluating unit 56 generates data of a report screen for notifying the user of the identified value of the color of the target object 9, without evaluating the color of the target object 9 on the basis of the color of the target object 9 identified in the past and the color of the target object 9 identified this time (step S125).

The transmitting unit 57 transmits the data of the report screen generated by the evaluating unit 56 to the terminal apparatus 4 (step S126). The terminal apparatus 4 receives, as a response to the image data transmitted in step S110, the data of the report screen transmitted from the data processing apparatus 5 in step S126 (step S127). The terminal apparatus 4 displays the report screen using the browser in accordance with the received data (step S128).

Figure 11:
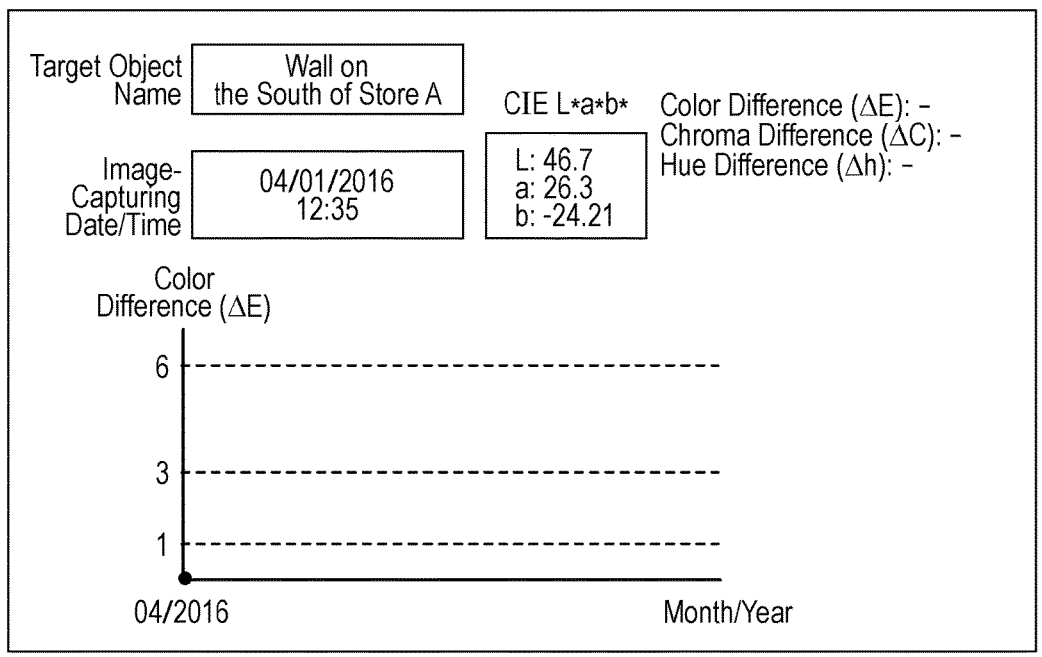
FIG. 11 illustrates a report screen displayed on a terminal apparatus according to the exemplary embodiment.

FIG. 11 illustrates a report screen displayed on the terminal apparatus 4 when the color of the certain target object 9 is identified for the first time. This report screen shows the value represented by the estimated target object color data generated in step S121, that is, the estimated value identified if the color of the target object 9 were measured with the color measuring device 2, together with the name of the target object 9 and the image-capturing date/time.

The user is able to know objective values indicating the change in the color of the target object 9 by repeatedly performing identification of the color of the target object 9 using the data processing apparatus 5, for example, at intervals of a predetermined period after performing the above-described identification of the color of the target object 9 using the data processing apparatus 5 once.

If the user repeatedly performs the operations of step S106 to S108 and S110 at certain intervals, the evaluating unit 56 determines in step S123 for the second and following times that the estimated target object color table (FIG. 8) corresponding to the target object 9 has plural records (YES in step S123). In such a case, the evaluating unit 56 evaluates the color of the target object 9 on the basis of the estimated target object color data generated by the converting unit 54 in the processing of step S121 performed for the first time and the estimated target object color data generated by the converting unit 54 in step S121 performed this time (step S124).

In this exemplary embodiment, the evaluating unit 56 uses the estimated target object color data generated for the first time by the converting unit 54 as reference color data representing a value of a reference color of the target object 9. The evaluating unit 56 then identifies a color difference (ΔE), a chroma difference (ΔC), and a hue difference (Δh) of the color represented by the estimated target object color data generated by the converting unit 54 this time from the color represented by the reference color data, as an evaluation result of the color of the target object 9 at that time.

The evaluating unit 56 then generates data of a report screen that shows the evaluation result obtained in step S124 (step S125). The data of the report screen thus generated is transmitted from the data processing apparatus 5 to the terminal apparatus 4 (step S126) and is received by the terminal apparatus 4 (step S127). The terminal apparatus 4 displays the report screen using the browser in accordance with the data received from the data processing apparatus 5 (step S128).

Figure 12:
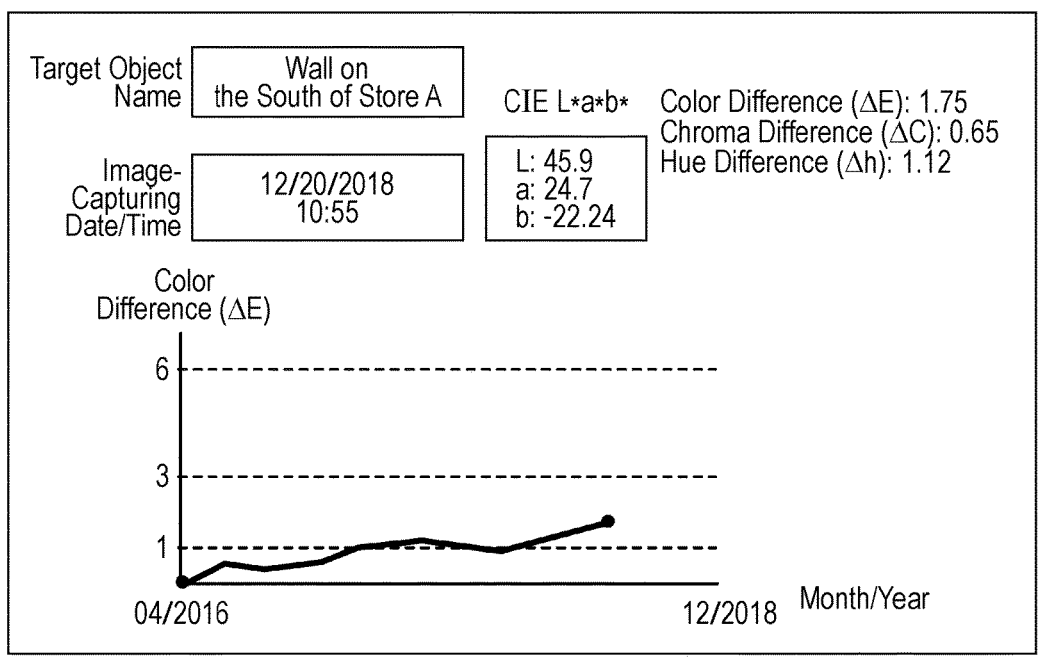
FIG. 12 illustrates a report screen displayed on the terminal apparatus according to the exemplary embodiment.

FIG. 12 illustrates a report screen displayed on the terminal apparatus 4 when identification of the color of the certain target object 9 is performed multiple times. This report screen shows a color difference (ΔE), a chroma difference (ΔC), and a hue difference (Δh) of the color of the target object 9 identified this time from the color of the target object 9 identified for the first time together with the name of the target object 9, the image-capturing date/time, and the value of the color of the target object 9 identified this time. In addition, how the color-difference has changed is displayed in a graph.

The user is able to know the estimated value of the color of the target object 9 obtained if the color of the target object 9 were measured with the color measuring device 2 on the report screen displayed on the terminal apparatus 4, without measuring the color of the target object 9 with the color measuring device 2.

For example, if the target object 9 is a wall of a store, the color of the target object 9 gradually fades over time because of the influence of sunlight or the like. However, it is not easy to correctly evaluate the change in the color of the target object 9 with the human eye because the change in the color is gradual and the color looks differently each time to the human eye depending on a factor, such as the weather or the time period. Accordingly, it is difficult to determine when to repaint the wall of the store with the human eye.

If the color of the target object 9 is directly measured with the color measuring device 2, the change in the color of the target object 9 is represented by a numeric value, and it becomes possible to reasonably determine a timing to repaint the wall, for example. However, the color measuring device 2 is relatively expensive despite its frequency of use. In contrast, the color identification method M according to the exemplary embodiment allows the user to obtain, generally at a lower cost, information that is substantially the same as the information obtained if the color of the target object 9 were measured with the color measuring device 2, by transmitting, to the data processing apparatus 5, image data obtained by capturing an image of the target object 9 with a digital camera by using the color chart 1.

Modifications

The above-described exemplary embodiment is merely an example of how the present invention is embodied and may be variously modified. Examples of such modifications will be described below. Note that two or more of the above-described exemplary embodiment and plural modifications described below may be combined as needed.

Figure 13:
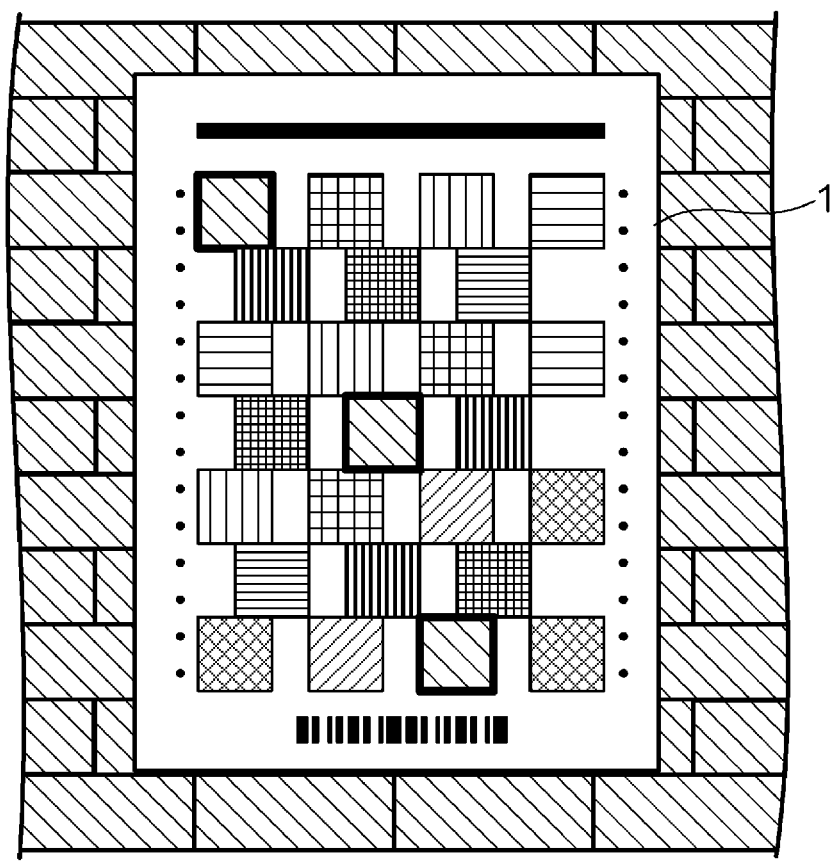
FIG. 13 illustrates a state in which the color chart is attached to a target object in accordance with a color identification method according to a modification.

(1) The color chart 1 has one hole in the above-described exemplary embodiment; however, the number of holes in the color chart 1 is not limited to one. FIG. 13 illustrates a state in which the color chart 1 having three holes is attached to a brick wall. In the example illustrated in FIG. 13, bricks seen through the three holes are different bricks and have different colors.

When the color chart 1 illustrated in FIG. 13 is used, the target object subjected to color identification is each brick seen through a corresponding one of the three holes. That is, each of the three bricks is the target object 9 in this case, and the colors of these bricks are identified.

If one image includes multiple target objects 9, values of the colors of the multiple target objects 9 in the image are converted, in accordance with the same correspondence, into respective values of the colors obtained if the colors were measured with the color measuring device 2.

In this modification, the determining unit 55 may determine whether the color identified, through conversion by the converting unit 54, for each of the target objects 9 included in the image captured with the image capturing apparatus 3 at positions corresponding to the plural holes of the color chart 1 satisfies a predetermined condition.

For example, if the position where the color chart 1 is attached when the user has captured the first image matches the position where the color chart 1 is attached when the user has captured the second or following image, the color differences (ΔE), the chroma differences (ΔC), and the hue differences (Δh) of the multiple target objects 9 generally do not vary greatly because color fading of the target objects 9 of the same kind progresses substantially in the same manner under the same environment. However, if the position where the color chart 1 is attached for the first time differs from the position where the color chart 1 is attached for the second or following time, the color differences (ΔE), the chroma differences (ΔC), and the hue differences (Δh) of the plural target objects 9 may vary greatly.

Accordingly, for example, the determining unit 55 may determine whether the color differences (ΔE) calculated for the plural target objects 9 included in the captured image at the respective holes of the color chart 1 are larger than or equal to a predetermined threshold. If the color differences (ΔE) are larger than the predetermined threshold, the transmitting unit 57 may transmit to the terminal apparatus 4 an error message prompting the user to check the position where the color chart 1 is attached. This consequently reduces an occurrence probability of incorrect information regarding the color of the target object 9 being provided to the user because of the incorrect attachment position of the color chart 1.

In addition, when the color chart 1 has multiple holes, any of or all of the multiple holes may be used for position alignment when the color chart 1 is attached to the target object 9.

(2) In the above-described exemplary embodiment, the measured values of the colors obtained with the color measuring device 2 are values according to the L*a*b* color space, whereas the values of the colors in the image captured with the image capturing apparatus 3 are values according to the RGB color model. However, the measured values of the colors obtained with the color measuring device 2 and the values of the colors in the image captured with the image capturing apparatus 3 each may be values according to any color space. In addition, the measured values of the colors obtained by the color measuring device 2 and the values of the colors in the image captured with the image capturing apparatus 3 may be values according to the same color space.

(3) In the above-described exemplary embodiment, the identifying unit 53 identifies, using the multiple regression analysis, a transform matrix representing correspondences between the measured values of the colors obtained with the color measuring device 2 and the values of the colors in the image captured with the image capturing apparatus 3. The method used by the identifying unit 53 to identify the correspondences is not limited to the multiple regression analysis, and the format representing the identified correspondences is not limited to a matrix. For example, the identifying unit 53 may identify, using a neural network, correspondences between the measured values of the colors obtained with the color measuring device 2 and the values of the colors in the image captured with the image capturing apparatus 3. In addition, the identifying unit 53 may generate data representing the correspondences using a lookup table (LUT) format.

(4) In the above-described exemplary embodiment, the evaluating unit 56 uses the estimated target object color data generated for the first time as the reference color data when calculating the color difference ($\Delta E$) and the like; however, the reference color data is not limited to the estimated target object color data generated for the first time. For example, reference color data representing a value of a standard color set in advance for the target object 9 may be used.

(5) In the above-described exemplary embodiment, the color chart 1 has a hole; however, the color chart 1 need not necessarily have a hole. For example, the color chart 1 may have a cut portion at any of the corners instead of the hole, and the value of the color of the target object 9 at the cut portion in the captured image may be identified. In addition, the color chart 1 may include neither a hole not a cut portion, the color chart 1 may be attached to the target object 9, and an image may be captured so that the color chart 1 and the target object 9 are arranged side by side. That is, both the color chart 1 and the target object 9 are just required to be in an image captured with the image capturing apparatus 3.

(6) In the above-described exemplary embodiment, an image is captured with the image capturing apparatus 3 in a state in which the color chart 1 is attached to the target object 9; however, the color chart 1 need not be attached to the target object 9. For example, an image of the color chart 1 and the target object 9 may be captured in a state in which the user is holding the color chart 1 so that the color chart 1 is located on the image capturing apparatus 3 side of the target object 9.

(7) In the above description of the exemplary embodiment, a brick wall is used as an example of the target object 9; however, the kind of the target object 9 is not limited. In addition, the usage of the value of the color of the target object 9 identified using the color identification method M is not limited. For example, the value of the color of a bolt may be identified using the color identification method M, and the identified value of the color of the bolt may be used to determine the corrosion degree of the bolt.

(8) Some or all of the operations performed by the administrator or the user in the above description of the exemplary embodiment may be performed by an apparatus instead of a person. For example, in the above-described exemplary embodiment, the administrator measures the color samples on the color chart 1 using the color measuring device 2 and inputs the measurement results to the data processing apparatus 5. These operations may be performed by an apparatus that measures the color samples on the color chart 1 once the color chart 1 is placed there, generates the measured color sample data representing the results, and transmits the measured color sample data to the data processing apparatus 5. In addition, an operation for capturing an image of the color chart 1 and the target object 9 may be performed by a robot.

(9) In the above-described exemplary embodiment, the data processing apparatus 5 identifies the target object 9 using the location data added to the image data; however, another kind of data, such as the target object ID assigned to each of the target objects 9, may be used as data for identifying the target object 9.

(10) In the above-described exemplary embodiment, the value of the color of the target object 9 in the image alone is converted by the converting unit 54. Instead of this configuration, the entire image may be subjected to conversion by the converting unit 54. In this case, the value of the color of the target object 9 in the converted image is the estimated value of the color of the target object 9 obtained if the color of the target object 9 were measured with the color measuring device 2.

(11) In the above-described exemplary embodiment, the color chart 1 is a sheet-like medium; however, the color chart 1 is not limited to the sheet-like medium. In addition, the design of the color chart 1 is not limited to the design described in the exemplary embodiment above.

(12) In the above-described exemplary embodiment, the color chart 1 is identified on a production lot basis. Instead of this configuration, the color chart is may be identified from one another. In addition, the color charts 1 of different production lots having the same color samples may be not distinguished from one another, and color charts 1 having different color samples may be distinguished from one another.

(13) In the above-described exemplary embodiment, the data processing apparatus 5 is implemented as a result of the general-purpose computer 10 performing data processing based on a program. Instead of this configuration, the data processing apparatus 5 may be configured by a dedicated apparatus.

(14) The program causing the computer 10 to function as the components of the data processing apparatus 5 in the above-described exemplary embodiment may be downloaded to the computer 10 via a communication line such as the Internet. In addition, this program may be distributed after being stored in a recording medium that non-volatilely stores data and may be read by the computer from the recording medium.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
   a computer programmed to execute a process of:
   obtaining measured color sample data and image data, the measured color sample data representing values obtained by measuring a plurality of color samples on a color chart with a color measuring device, the image data representing an image of the color chart and a target object captured with an image capturing apparatus;
   converting captured target object color data into estimated target object color data, based on: (i) the measured color sample data, which is the measured color sample data representing values obtained by measuring the plurality of color samples on the color chart with the color measuring device; and (ii) captured color sample data representing values of the plurality of color samples included in the image data,
   the captured target object color data representing a value of a color of the target object included in the image data, the estimated target object color data representing an estimated value of the color of the target object identified if the color of the target object were measured with the color measuring device;
   obtaining reference color data representing a value of a reference color of the target object;
   generating evaluation data representing a result obtained by evaluating the color of the target object based on the estimated target object color data and the reference color data; and
   displaying a report based on the evaluation data.

2. The data processing apparatus according to claim 1, wherein the computer is further programmed to execute a process of obtaining the estimated target object color data generated using the image data representing an image captured at a first time point, as the reference color data used in evaluation performed based on the estimated target object color data generated using the image data representing an image captured at a second time point.

3. The data processing apparatus according to claim 1, wherein the computer is further programmed to execute a process of obtaining location data representing a location where the image represented by the image data has been captured, identifying the target object from other target objects based on the location data, and obtaining the reference color data corresponding to the identified target object.

4. The data processing apparatus according to claim 1, wherein the color chart has an identifier for identifying the color chart from other color charts, and
   wherein the computer is further programmed to execute a process of identifying the color chart based on the identifier of the color chart included in the image represented by the image data and obtaining the measured color sample data corresponding to the identified color chart.

5. The data processing apparatus according to claim 1, wherein the color chart has a plurality of holes, and
   wherein the computer is further programmed to execute a process of determining whether values of colors of the target object at positions of the plurality of holes in the image represented by the image data each satisfy a predetermined condition.

6. A color identification method comprising:
   measuring, with a color measuring device, a plurality of color samples on a color chart;
   capturing, with an image capturing apparatus, an image of the color chart and a target object;
   converting, based on: (i) measured values of the plurality of color samples obtained in the measuring, the measured values representing values obtained by measuring the plurality of color samples on the color chart with the color measuring device; and (ii) values of the plurality of color samples included in image data representing the image captured in the capturing, a value of a color of the target object included in the image data into an estimated value of the color of the target object identified if the color of the target object were measured with the color measuring device;
   obtaining reference color data representing a value of a reference color of the target object;
   generating evaluation data representing a result obtained by evaluating the color of the target object based on the estimated value of the color of the target object and the reference color data; and
   displaying a report based on the evaluation data.

7. A non-transitory computer readable medium storing a program causing a computer to execute a process, the process comprising:
   obtaining measured color sample data and image data, the measured color sample data representing values obtained by measuring a plurality of color samples on a color chart with a color measuring device, the image data representing an image of the color chart and a target object captured with an image capturing apparatus; and
   converting captured target object color data into estimated target object color data, based on: (i) the measured color sample data, which is the measured color sample data representing values obtained by measuring the plurality of color samples on the color chart with the color measuring device; and (ii) captured color sample data representing values of the plurality of color samples included in the image data,
   the captured target object color data representing a value of a color of the target object included in the image data, the estimated target object color data representing an estimated value of the color of the target object identified if the color of the target object were measured with the color measuring device;
   obtaining reference color data representing a value of a reference color of the target object;
   generating evaluation data representing a result obtained by evaluating the color of the target object based on the estimated target object color data and the reference color data; and
   displaying a report based on the evaluation data.

8. A color chart comprising:
   a plurality of color samples on the color chart, wherein the plurality of color samples are squares of the same size, the color chart is a sheet-like medium having one or more through-holes, and each through-hole is a square through-hole having a size that is the same as the size of the squares of the color samples.

9. The color chart according to claim 8, further comprising:

an identifier for identifying the color chart from other color charts thereon.

10. The data processing apparatus according to claim 1, wherein the computer is further programmed to execute the process of displaying the report in association with the value represented by the evaluation data when the estimated target object color data of the target object is generated multiple times.

11. The data processing apparatus according to claim 1, wherein the report includes a representation of the estimated target object color data of the target object at multiple different dates.

\* \* \* \* \*